Patented Dec. 30, 1952

2,623,870

UNITED STATES PATENT OFFICE 2,623,870

QUATERNARY AMMONIUM SALTS

Herbert L. Sanders, Phillipsburg, N. J., assignor to General Aniline & Film Corporation, New York, N. Y., a corporation of Delaware No Drawing. Application January 10, 1950, Serial No. 137,883

3 Claims. (Cl. 260—100)

This invention relates to novel surface-active quaternary ammonium salts.

The quaternary ammonium salts of this invention are N-polyethenoxy derivatives of dehydroabietinyl amines, and can be represented by the general formula

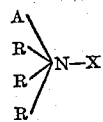

wherein A represents a dehydroabietinyl radical:

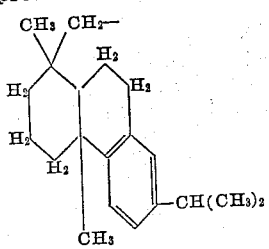

X represents an anion of a salt-forming acid, and the R's represent N-substituents of the class consisting of lower alkyl (e. g. of 1 to 4 carbon atoms), β-hydroxyethyl, and polyethylene ether radicals, including at least 2 and especially 2 to 40 oxyethylene radicals. The compositions of the invention may be single compounds, but are usually mixtures of compounds of the foregoing general formula.

The compositions of this invention are water-soluble and characterized by outstanding emulsifying power for water-insoluble hydrocarbons. More particularly, compounds containing 2 to 5 oxyethylene radicals per molecule yield stable aqueous emulsions of aliphatic water-immiscible solvents, while those containing more than 5 oxyethylene radicals per molecule yield stable aqueous emulsions of aromatic water-immiscible solvents. The products also possess detergent properties in aqueous solution.

The quaternary ammonium salts of the invention can be prepared in a number of ways. Thus, N-polyethenoxy derivatives of dehydroabietinyl amine, prepared by condensation of 2 to 40 mols of ethylene oxide with dehydroabietinyl primary amine can be converted to quaternary ammonium salts by reaction with alkylating agents such as alkyl esters of inorganic acids, e. g. diethyl- or dimethyl-sulfate, methyl- or ethyl-iodide, or dibutyl-sulfate, suitable for the alkylation of amines. A mixture is thus obtained of quaternary ammonium salts in which the N-substituents represented by R are the alkyl groups of the alkylating agent, and the hydroxyethyl or polyethylene glycol radicals originally introduced by condensation with ethylene oxide. Condensation products of this type containing 4 to 40 ethenoxy radicals in the substituent groups of pentavalent nitrogen are disclosed in my copending application Serial No. 133,223, filed December 15, 1949.

Another method for preparing compositions of this invention involves N-alkylation of dehydroabietinyl primary amine by reaction with an alkylating agent such as dimethyl-, diethyl- or dibutyl-sulfate, or methyl- or ethyl-iodide, in such proportions as to form a tertiary amine, followed by condensation of the tertiary amine with 2 to 40 mols of ethylene oxide, for example, in accordance with the process of USP 2,127,476. The resulting quaternary ammonium bases can be readily converted to salts by neutralizing them with a salt-forming acid.

The following examples, wherein parts are by weight, illustrate the preparation of a number of quaternary ammonium salt compositions in accordance with my invention.

Example 1

150.5 parts of a condensation product of dehydroabietinyl amine (e. g. a commercial product known as "Rosin Amine D") with about 9 mols of ethylene oxide (prepared, for example, as described in my copending application Serial No. 133,223, by condensation of 59 parts of dehydroabietinyl amine with 101.7 parts of ethylene oxide in the presence of sodium methylate as a catalyst at 155 to 165° C.) are agitated, and 23.8 parts of dimethyl sulfate are slowly added while raising the temperature to 80° C. The reaction mixture is maintained at this temperature for 6 hours and then cooled. The resulting quaternary dehydroabietinyl methyl polyethenoxylated ammonium sulfate is a semi-solid amorphous mass, soluble in water.

When tested for detergency in water at concentrations from 0.05% to 0.5% for washing soiled cotton cloth having a reflecting power of 52%, the reflecting power of the cloth was increased to 62 to 65%, whereas the original dehydroabietinyl amine in the form of its acetate, at similar concentrations, increased the reflecting power of the same cloth to at most 54% under similar testing conditions. The detergency of the product was found to be of the same order as that of a commercially known alkylphenol polyethylene oxide condensation product noted for its excellence as a detergent. Stable aqueous emulsions of benzene, toluene or xylene are readily formed by incorporating a small proportion of the quaternary ammonium salt in water and emulsifying the aromatic solvent therein.

*Example 2*

103 parts of a condensation product of dehydroabietinyl amine with about half the amount of ethylene oxide employed in preparing the starting material of Example 1 is reacted with 23.8 parts of dimethyl-sulfate by the procedure employed in the foregoing example. A product of similar appearance is obtained which yields stable emulsions of petroleum distillates, such as kerosene, when incorporated together with such solvents in water. The quaternary ammonium salt thus obtained contains between 4 and 5 oxyethylene radicals per molecule of quaternary ammonium compound.

*Example 3*

1 part of dehydroabietinyl diethylamine, prepared by reaction of dehydroabietinyl primary amine with the calculated amount of ethyliodide, and liberation of the free amine from the resulting iodide by reaction with caustic alkali, is suspended in 2 parts of water and ethylene oxide is introduced into the suspension at a temperature of 50 to 60° C. until 1.5 parts of ethylene oxide are absorbed. Sufficient 10% sulfuric acid is added to the mixture to render it neutral. A quaternary ammonium sulfate is thus obtained having about 9 oxyethylene radicals per mol of quaternary ammonium salt, and the product possesses properties similar to those of the product of Example 1.

Instead of dimethyl-sulfate, diethyl- or dibutyl-sulfate can be used in equivalent proportions in the foregoing examples to produce corresponding quaternary ammonium salts having ethyl or butyl groups attached to nitrogen. Salts of other acids can be prepared from the sulfate or iodide initially obtained, by conversion of the salt to the free base (e. g. by reaction of the sulfate with barium hydroxide or the iodide with silver oxide) and neutralizing the quaternary ammonium base thus obtained with another acid such as hydrochloric, hydrobromic, phosphoric, acetic, formic and the like. If the free base is originally obtained as in Example 3, it can be neutralized directly with an acid of the aforesaid class.

Condensation products containing larger proportions of ethylene oxide, e. g. up to 40 mols of ethylene oxide per mol of amine, obtained, for example, as disclosed in the examples of my copending application Serial No. 133,223, can be converted to quaternary ammonium salts of this invention in accordance with the procedures of Examples 1 and 2, and similar condensation products containing as little as 2 mols of ethylene oxide per mol of amine can be similarly converted to quaternary ammonium salts. In condensing dehydroabietinyl dialkylamines with ethylene oxide as disclosed in Example 3, the proportions of ethylene oxide can likewise be varied from 2 to 40 mols per mol of amine so as to obtain quaternary ammonium salts of similar properties.

Variations and modifications which will be obvious to those skilled in the art can be made in the foregoing procedures without departing from the scope or nature of the invention.

I claim:

1. A salt of a quaternary ammonium base having the formula:

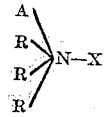

wherein X represents the anion of a salt-forming acid, A represents a dehydroabietinyl radical, and the R's represent N-substituents of the class consisting of lower alkyl groups, a β-hydroxyethyl radical, and polyethylene ether radicals containing a terminal hydroxyl group, said N-substituents including at least 1 lower alkyl group, and at least 2 oxyethylene radicals in said β-hydroxyethyl and polyethylene ether radicals.

2. A quaternary ammonium salt as defined in claim 1, containing 2 to 40 oxyethylene radicals per molecule.

3. N-methylated-N-polyethoxylated dehydroabietinyl ammonium sulfate containing about 9 oxyethylene radicals per molecule.

HERBERT L. SANDERS.

REFERENCES CITED

The following references are of record in the file of this patent:

UNITED STATES PATENTS

| Number | Name | Date |
|---|---|---|
| 2,127,476 | Ulrich | Aug. 16, 1938 |
| 2,194,429 | Krzikalla | Mar. 19, 1940 |
| 2,490,924 | Schertz | Dec. 13, 1949 |
| 2,510,063 | Bried | June 6, 1950 |
| 2,510,284 | Haggard | June 6, 1950 |

FOREIGN PATENTS

| Number | Country | Date |
|---|---|---|
| 467,571 | Great Britain | June 16, 1937 |

OTHER REFERENCES

Borglin: Soap and Sanitary Chemistry, December 1947, pp. 147, 149 and 167.